(12) United States Patent
Standifer

(10) Patent No.: US 10,479,417 B1
(45) Date of Patent: Nov. 19, 2019

(54) TRUCK TAILGATE AND BUMPER ASSEMBLY

(71) Applicant: FORD GLOBAL TECHNOLOGIES, LLC, Dearborn, MI (US)

(72) Inventor: Cliff Standifer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/120,795

(22) Filed: Sep. 4, 2018

(51) Int. Cl.
| | |
|---|---|
| *B62D 33/02* | (2006.01) |
| *E05F 5/02* | (2006.01) |
| *B62D 33/027* | (2006.01) |
| *B60J 5/10* | (2006.01) |
| *B62D 33/03* | (2006.01) |

(52) U.S. Cl.
CPC .......... *B62D 33/0273* (2013.01); *B60J 5/108* (2013.01); *B62D 33/03* (2013.01); *E05F 5/022* (2013.01); *E05F 5/025* (2013.01); *E05Y 2900/546* (2013.01)

(58) Field of Classification Search
CPC ...... B60J 5/108; B62D 33/0273; B62D 33/03; E05F 5/022; E05F 5/025
USPC .................................................. 296/207, 57.1
See application file for complete search history.

(56) References Cited

U.S. PATENT DOCUMENTS

| | | | | |
|---|---|---|---|---|
| 6,039,388 | A * | 3/2000 | Choi .................... | E05F 5/022 296/207 |
| 6,039,389 | A * | 3/2000 | Monette ................ | B60J 5/101 296/207 |
| 6,349,989 | B1 * | 2/2002 | Kim ...................... | B60J 5/101 296/146.9 |
| 6,976,723 | B2 * | 12/2005 | Libby .................... | B60P 1/26 296/50 |
| 7,739,977 | B1 * | 6/2010 | Lawrence ............... | B60Q 9/00 116/28 R |
| 8,532,873 | B1 | 9/2013 | Bambenek et al. | |
| 8,678,486 | B2 * | 3/2014 | Chaufour ............... | F16F 1/373 16/374 |
| 9,574,386 | B2 | 2/2017 | Hillgaertner et al. | |
| 9,598,122 | B2 | 3/2017 | Lee et al. | |
| 10,252,606 | B2 * | 4/2019 | Masumoto ............. | B60J 10/86 |
| 2005/0093342 | A1 * | 5/2005 | Kim ...................... | B60J 5/101 296/207 |
| 2006/0097550 | A1 | 5/2006 | Wang et al. | |
| 2008/0224494 | A1 * | 9/2008 | Anderson ............. | E05D 7/1072 296/57.1 |
| 2013/0214561 | A1 * | 8/2013 | Chaufour ............... | F16F 1/373 296/207 |
| 2014/0338167 | A1 * | 11/2014 | Jackson, Jr. .......... | B60J 5/101 29/418 |
| 2015/0059125 | A1 | 3/2015 | Aldersley et al. | |
| 2018/0087308 | A1 * | 3/2018 | Osti ...................... | E05F 5/022 |

FOREIGN PATENT DOCUMENTS

| | | |
|---|---|---|
| DE | 102017006694 A1 | 1/2018 |
| KR | 20050100033 A | 10/2005 |

* cited by examiner

*Primary Examiner* — Jason S Morrow
(74) *Attorney, Agent, or Firm* — Vichit Chea; MacMillan, Sobanski & Todd, LLC

(57) ABSTRACT

A vehicle, such as a pickup truck, includes a bed pillar and a tailgate pivotally engaging the bed pillar. A bumper includes a body secured to the bed pillar, a lever pivotally mounted to the body and having a pad, and a spring biasing the pad into contact with the tailgate in a closed position. The lever may pivot to push the tailgate rearward.

16 Claims, 5 Drawing Sheets

TRUCK TAILGATE AND BUMPER ASSEMBLY

BACKGROUND OF THE INVENTION

The present invention relates to a tailgate for a truck and more particularly to a truck having an open-assist bumper employed with the tailgate.

For some trucks, and especially for pickup trucks, a remote tailgate release may be available to assist in opening the tailgate to facilitate loading/unloading of cargo. A remote tailgate release may be activated by a key fob. When a tailgate release button is pressed on the fob, the tailgate latch is released, with the tailgate pressed against a solid rubber-like bumper. Preferably, upon this remote release, the tailgate pivots slightly from its fully closed position, whereupon the weight of the tailgate itself is sufficient to complete the opening of the tailgate. A damper system may be employed to allow the tailgate to slowly pivot to the open position in a controlled manner.

However, when the truck is parked on a slope with the front lower than the rear the tailgate may not move to the desired position upon remote release. Additionally, when the bed is covered with a cover such as a Tonneau cover, a seal at the rear of the cover may press down on the top of the tailgate, again possibly preventing the tailgate from moving to the desired position upon remote release. Moreover, corrosion, debris accumulation and grease dry-out of the lubricated tailgate components over time may eventually inhibit the completion of the remote opening process. And, a conventional rubber-like bumper may have material wear over time where the compression eventually is insufficient to move the tailgate as desired after latch release.

Consequently, if the tailgate is remotely unlatched using a key fob but does not complete the opening process due to factors such as hill parking, a Tonneau cover or time degradation factors, the vehicle operator may not notice that the tailgate is unlatched. This may be an undesirable condition where the tailgate may then unexpectedly open at a later time.

SUMMARY OF THE INVENTION

An embodiment contemplates a vehicle having a bed pillar and a tailgate pivotally engaging the bed pillar. A bumper includes a body secured to the bed pillar, a lever pivotally mounted to the body and having a pad, and a spring biasing the pad into contact with the tailgate in a closed position.

An embodiment contemplates a method of opening a vehicle tailgate including releasing a tailgate from a latch post mounted to a bed pillar; and pivoting a lever, biased by a spring, having a pad pressed against a front surface of the tailgate to push the tailgate rearward, with the lever pivotably mounted to a body secured to the bed pillar.

An advantage of an embodiment is that upon remote tailgate release, the active bumper moves the tailgate sufficiently to allow for completion of the tailgate opening process—even when the vehicle is parked on a hill, a Tonneau cover is used or there is degradation of some components due to time and wear. This is accomplished while still providing overslam damping protection during closing of the tailgate, as well as lateral and longitudinal support of the tailgate while in the closed position. Moreover, the active bumper is compact, easy to install on a vehicle, and may be formed from long-wearing materials. Also, the amount of force desired for initial remote opening of the tailgate may be easily adjusted by changing the spring in the active bumper to one with a higher or lower force, as desired.

DETAILED DESCRIPTION

Figure 1:
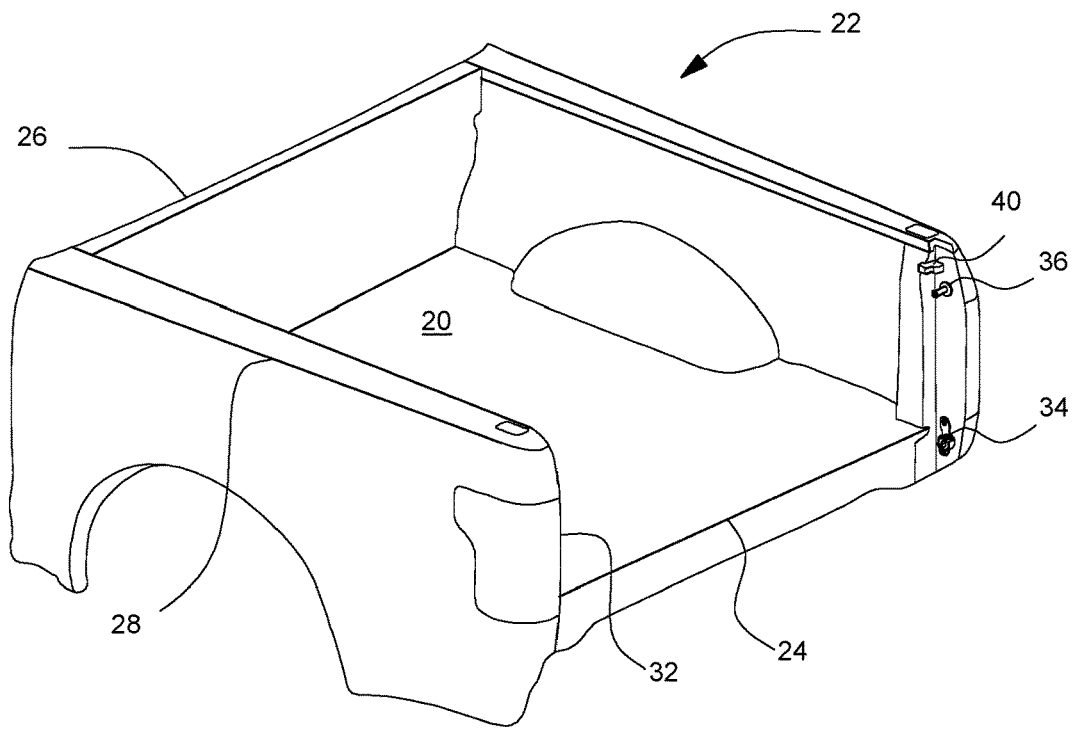
FIG. 1 is a schematic perspective view of a portion of a pickup truck bed, without a tailgate shown.
Figure 2:
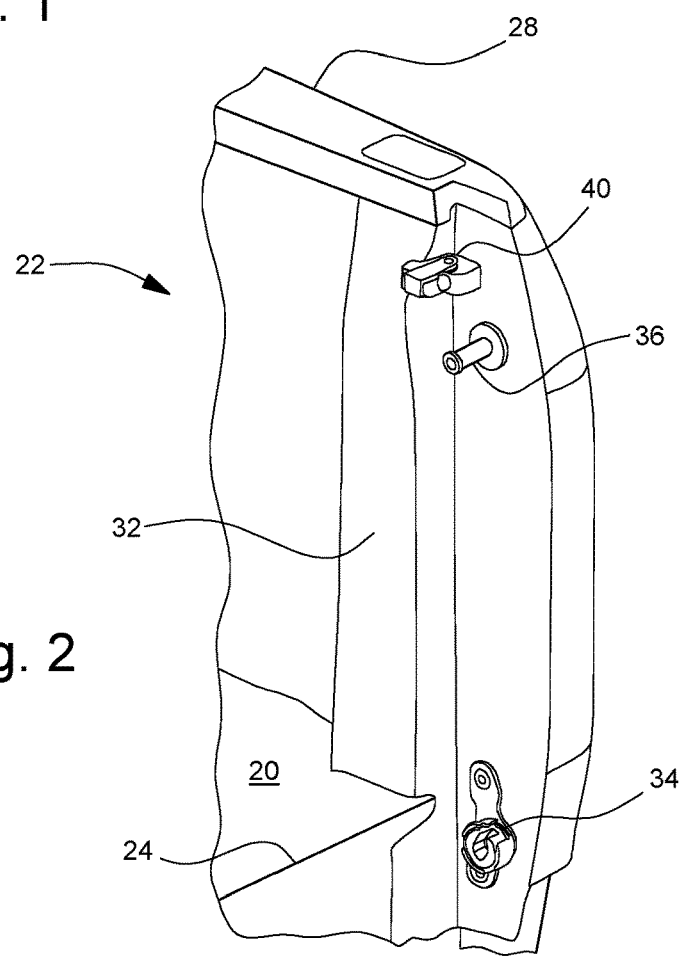
FIG. 2 is a schematic perspective view of a portion of a truck bed pillar, without the tailgate shown.
Figure 3:
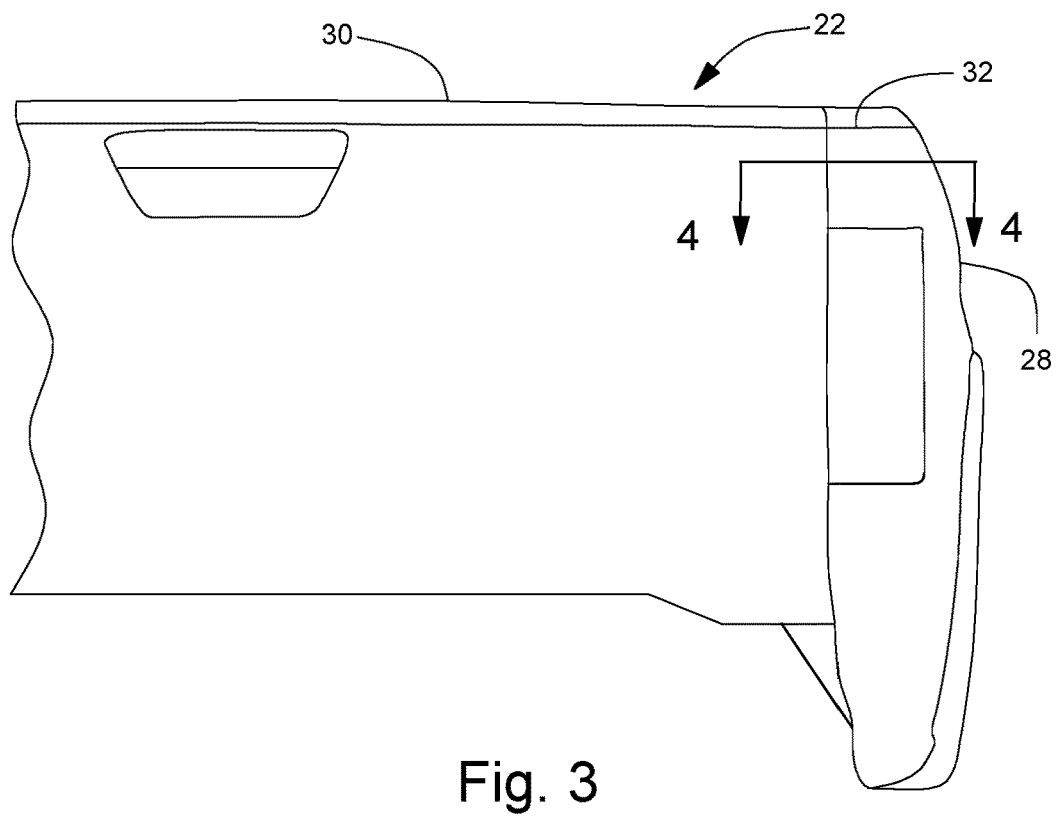
FIG. 3 is a schematic rear view of a portion of a pickup truck bed, with the tailgate shown.
Figure 4:
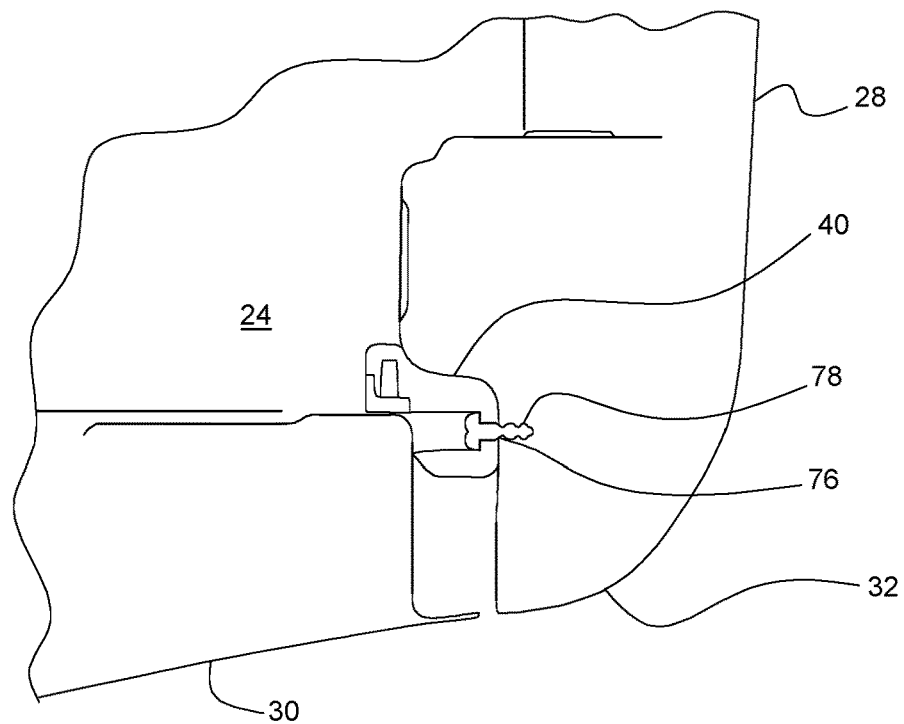
FIG. 4 is a schematic plan view, looking in the direction of 4-4 in FIG. 3, of a portion of a pickup truck bed, with tailgate shown, and with the active bumper shown schematically for purposes of showing the location of the active bumper mounted to the bed pillar.

FIGS. 1-4 illustrate a bed 20 of a vehicle 22, such as a pickup truck, including a floor 24 surrounded by a front wall 26, a pair of sidewalls 28 and a tailgate 30. Each sidewall 28 includes a truck bed pillar 32 at its rear end, with a tailgate pivot hinge 34 about which the tailgate 30 pivots, a latch post 36 to which the tailgate 30 is selectively secured, and an active bumper 40.

Since the pivot hinges 34, latch posts 36 and active bumpers 40 are mounted on both the left and right hand sides of the vehicle 22, being mirror images of each other, just the right hand side components will be shown in the figures. Other than being mirror images of the right side components, the left side components look and operate the same. Also, since the tailgate and system for remote latch release may be conventional, if so desired, the details of such tailgate and system will not be discussed in detail herein—a tailgate and system for remote latch release are disclosed in U.S. Pat. No. 8,532,873, the entirety of which is incorporated herein by reference.

Figure 5:
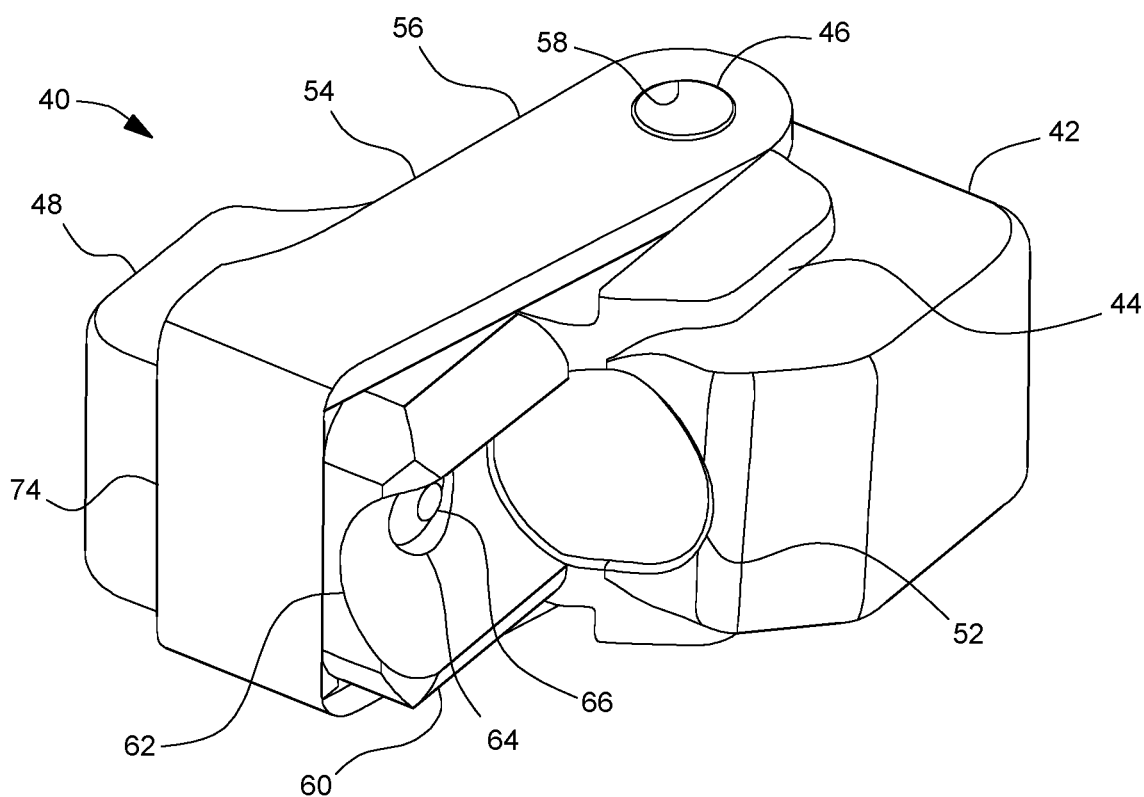
FIG. 5 is a schematic perspective view of an active bumper in a compressed (tailgate closed) state.
Figure 6:
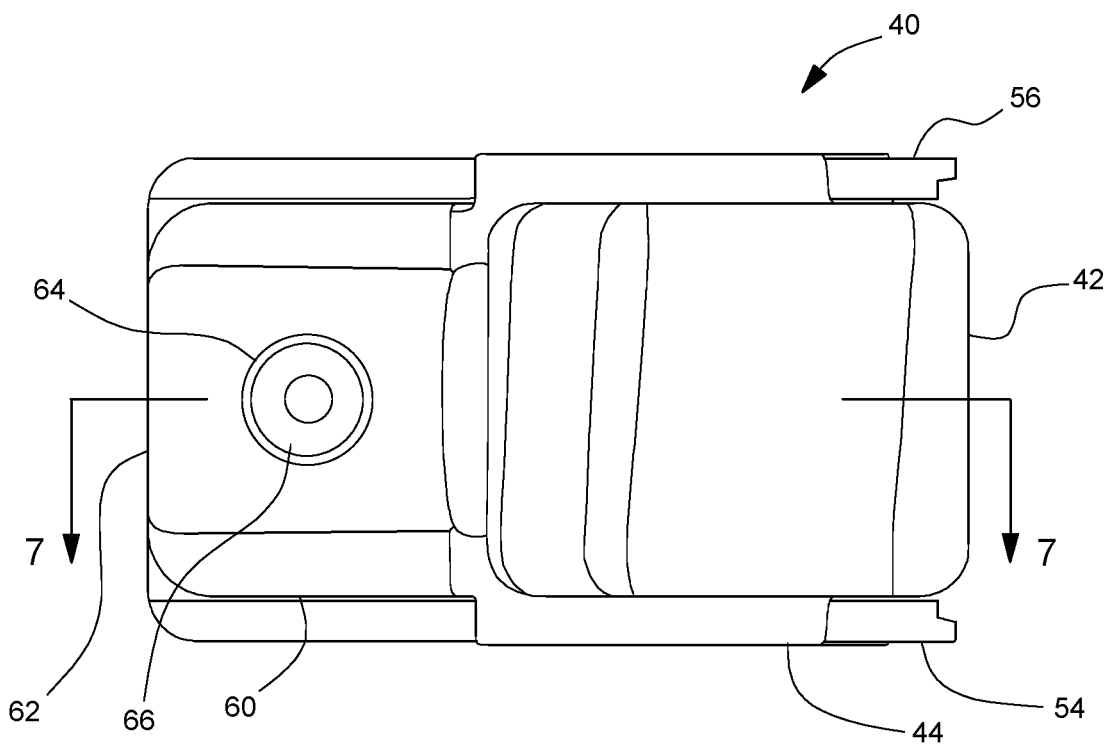
FIG. 6 is a schematic forward looking view of the active bumper of FIG. 5
Figure 7:
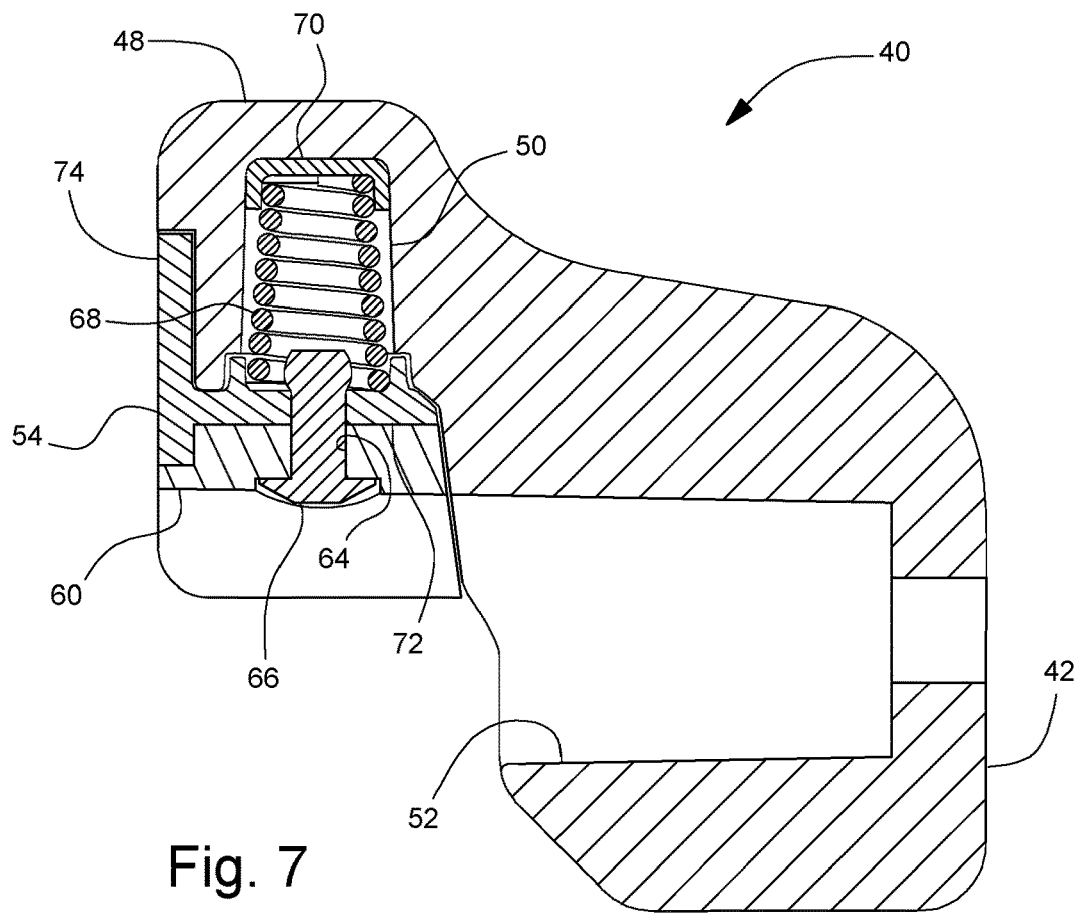
FIG. 7 is a schematic cross section view of the active bumper, taken along line 7-7 in FIG. 6, shown in the compressed (tailgate closed) state.
Figure 10:
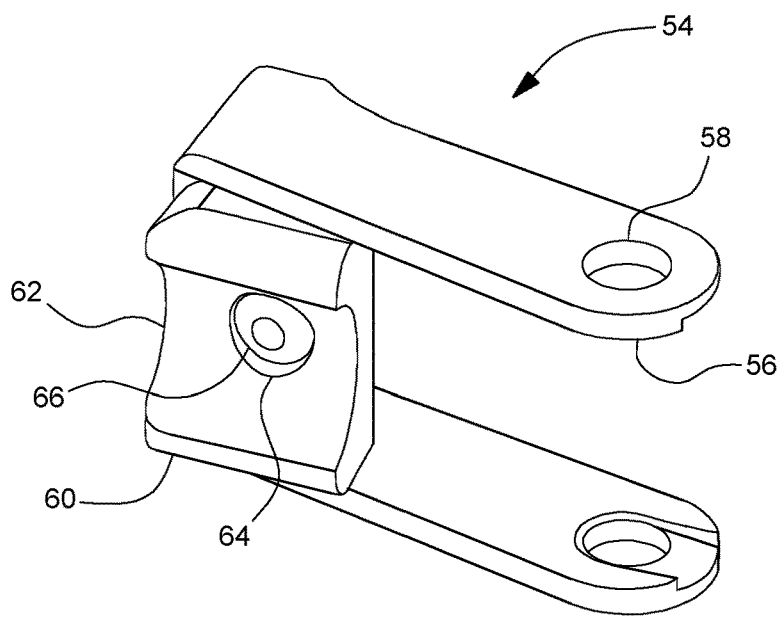
FIG. 10 is a perspective view of the lever of the active bumper.
Figure 8:
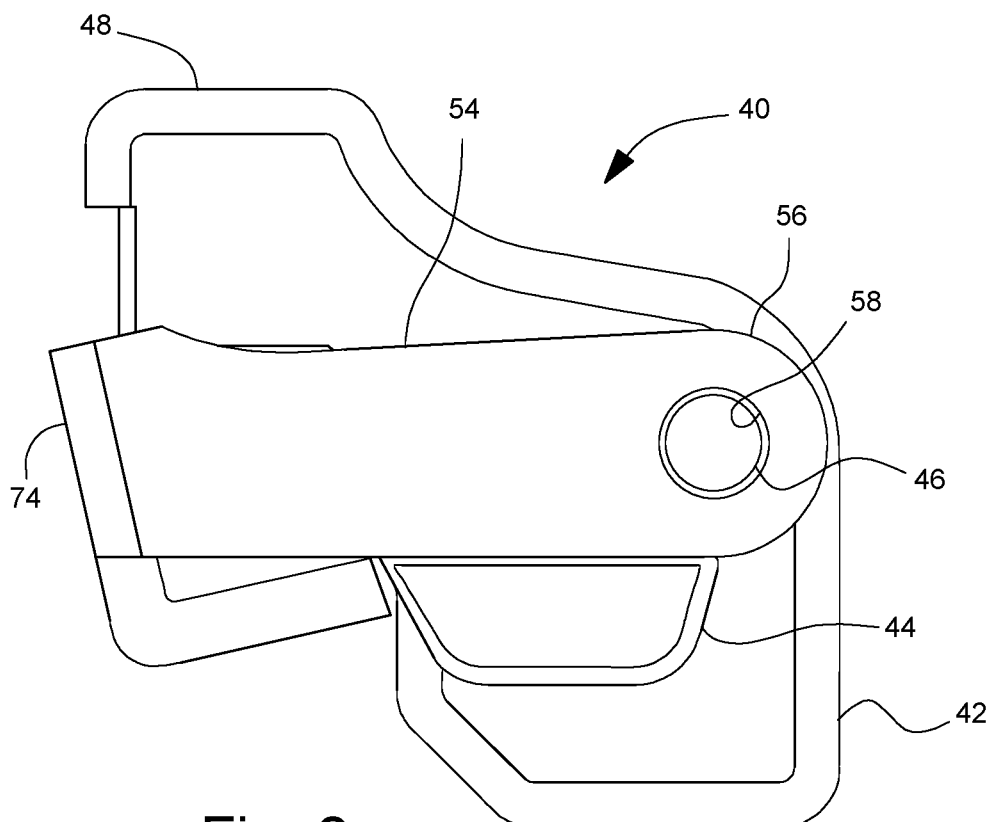
FIG. 8 is a schematic plan view of the active bumper in a free (tailgate open) state.
Figure 9:
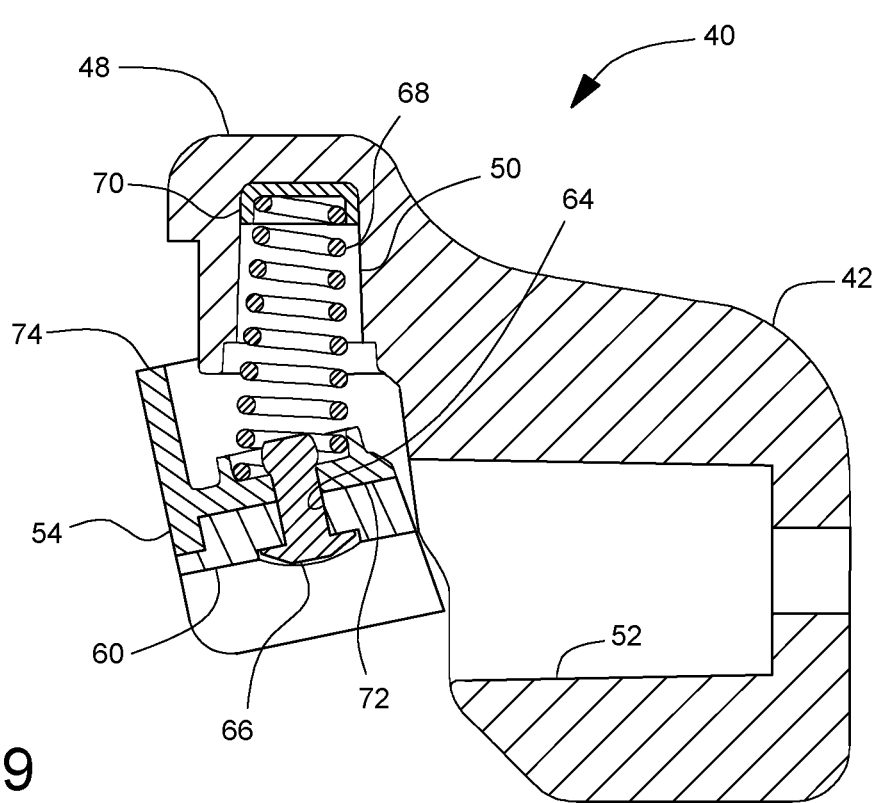
FIG. 9 is a schematic cross section similar to FIG. 7, but with the active bumper shown in the free (tailgate open) state.

FIGS. 5-10 illustrate the active bumper 40 and portions thereof. The active bumper 40 includes a body 42, which may be formed from a rubber or rubber-like material, if so desired. The body 42 includes a pair of stops 44, extending outward from the body 42 on opposite sides, adjacent to a pair of pivots 46, extending outward from the body 42 on opposite sides, a spring support 48 with a spring recess 50, and a fastener channel 52.

A generally U-shaped lever 54 includes a pair of arms 56 having holes 58 for securing around the pivots 56. The lever 54 may be formed of a material that allows for flexing to bend the arms 56 outward until the holes 58 align with the pivots 46 and then snap onto the pivots 46 to pivotably secure the lever 54 to the body 42. The lever 54 also includes an alignment member 72 between the arms 56.

A pad 60 is secured to, and pivots with, the lever 54. The pad 60 may be made from a high abrasion plastic that allows for repeated impact with and rubbing against the tailgate 30 (shown in FIG. 4). The pad 60 may include a notch 62 that is shaped to align with the fastener channel 52 when the lever 54 is in a compressed (tailgate closed) state, and a rivet hole 64 that receives a rivet 66 (or other type of fastener).

The rivet 66 extends through the rivet hole 64 and is secured to the alignment member 72, which also includes a flange 74 that slides over the spring support 48 flush with an inboard side of the spring support 48. The alignment member 72 receives one end of a compression spring 68. The compression spring 68 may be a conical spring, if so desired. The other end of the compression spring 68 is received in the recess 50 of the spring support 48. The bottom of the recess 50 may include a cup 70 for receiving and supporting the other end of the spring 68, if so desired. The spring 68 is replaceable to allow one to replace the spring 68 with one of higher or lower spring force, as is desired for the particular vehicle model and accessories.

To assemble the active bumper, then, one inserts the cup 70 and spring 68 into the recess 50, flexes the arms 56 outward and moves the lever 54 until the holes 58 align with the pivots 46 and the alignment member 72 aligns with an end of the spring 68, at which point the arms 56 are released. The arms 56 will then be pivotable about the pivots 46 between the compressed (tailgate closed) state, where the alignment member 72 abuts the spring support 48, and the free (tailgate open) state, where the stops 44 prevent the arms 56 from pivoting outward any farther. This total pivoting may occur over an angle of about 12.5 degrees—although this may be a larger or smaller number of degrees of pivoting, if so desired.

Each of the active bumpers 40 may be secured to their respective bed pillars 32 by aligning the fastener channel 52 with a hole 76 in the corresponding pillar 32, pushing the pad 60 forward so as not to block the opening of the fastener channel 52, inserting a fastener 78 through the fastener channel 52 and screwing into the hole 76. The assembly of the active bumper 40 to the pillar 32 can best be seen in FIGS. 2 and 4.

The operation of the active bumper 40 and tailgate 30 will now be discussed with reference to FIGS. 1-9. With the tailgate 30 closed (shown in FIGS. 3-4), the active bumpers 40 are in their compressed (tailgate closed) state (shown in FIGS. 4-7), with the springs 68 being compressed. In this closed state the active bumpers 40 support the tailgate 30, with the inboard sides of the bodies 42 surrounding the fastener channels 52 laterally supporting the sides of the tailgate 30 and the pads 60 longitudinally supporting a forward face of the tailgate 30, with the springs 68 biasing the pads 60 into contact with the tailgate 30.

When one activates the remote tailgate opening function, via a key fob or other remote device such as a cell phone, latches in the tailgate 30 are released from engaging the latch posts 36. Upon unlatching, the force produced by the compressed springs 68 pushes on the levers 54, which pivot about the pivots 46 until the arms 56 contact the stops 44. As the levers 54 pivot, the pads 60 push the top of the tailgate 30 outward (rearward) to a slightly open position (the free (tailgate open) state of the active bumper 40, shown in FIGS. 8 and 9). This slightly open position of the tailgate 30 is sufficient to allow gravity to pivot the tailgate 30 about the pivot hinges 34 to its fully open position.

Upon one closing the tailgate 30, as the tailgate 30 pivots into its closed position, the front surface of the tailgate 30 contacts the pads 60, pushing against the bias of the springs 68, and pivoting the lever 54 into the tailgate closed state. Thus, the active bumpers 40 also provide overslam damping during the tailgate closing process, as well as absorbing vibrations during vehicle operation.

While certain embodiments of the present invention have been described in detail, those familiar with the art to which this invention relates will recognize various alternative designs and embodiments for practicing the invention as defined by the following claims.

The invention claimed is:

1. A vehicle comprising:
a bed pillar;
a tailgate pivotally engaging the bed pillar; and
a bumper including a body secured to the bed pillar, a lever pivotally mounted to the body and having a pad, and a spring biasing the pad into contact with the tailgate in a closed position.

2. The vehicle of claim 1 wherein the body is configured to engage a side of the tailgate for lateral support in a closed position, and the pad is configured to engage a front surface of the tailgate in a closed position.

3. The vehicle of claim 1 wherein the spring is a compression spring.

4. The vehicle of claim 3 wherein the spring is a conical spring.

5. The vehicle of claim 3 wherein a first end of the spring is biased against the lever and a second end of the spring is biased against a spring support portion of the body.

6. The vehicle of claim 1 wherein the body includes a stop configured to limit the pivoting of the lever relative to the body due to the bias of the spring.

7. The vehicle of claim 1 further including pivots extending from opposed sides the body, the lever is generally U-shaped with a pair of parallel arms, and the arms engage the pivots to pivotally secure the lever to the body.

8. The vehicle of claim 7 wherein a first end of the spring is biased against the lever and a second end of the spring is biased against a spring support portion of the body.

9. The vehicle of claim 7 wherein the body includes a stop configured to engage one of the arms to limit the pivoting of the lever relative to the body due to the bias of the spring.

10. The vehicle of claim 1 wherein the body includes a fastener channel extending therethrough, and a fastener in the fastener channel that engages the bed pillar to secure the body to the bed pillar.

11. A method of opening a vehicle tailgate comprising:
releasing a tailgate from a latch post mounted to a bed pillar; and
pivoting a lever, biased by a spring, having a pad pressed against a front surface of the tailgate to push the tailgate rearward, with the lever pivotably mounted to a body secured to the bed pillar.

12. The method of claim 11 further including, limiting the extent of pivoting of the lever by a stop extending from the body.

13. The method of claim 11 further including engaging the body against a side of the tailgate when the tailgate is in a closed position.

14. The method of claim 11 further including compressing the spring between a spring support portion of the body and the lever, biasing the lever pivotally toward the tailgate.

15. The method of claim 11 wherein the pivoting of the lever is further defined by pivots extending from opposed sides the body, the lever being generally U-shaped with a pair of parallel arms, and the arms engaging the pivots to pivotally secure the lever to the body.

16. The method of claim 11 further comprising:
   prior to releasing the tailgate, biasing the pad against the tailgate with the spring to absorb vibrations of the tailgate.

* * * * *